United States Patent
Peterson

(10) Patent No.: US 8,706,264 B1
(45) Date of Patent: Apr. 22, 2014

(54) TIME SYNCHRONIZED REGISTRATION FEEDBACK

(75) Inventor: Dale Peterson, Waukesha, WI (US)

(73) Assignee: Cognex Corporation, Natick, MA (US)

( * ) Notice: Subject to any disclaimer, the term of this patent is extended or adjusted under 35 U.S.C. 154(b) by 982 days.

(21) Appl. No.: 12/337,150

(22) Filed: Dec. 17, 2008

(51) Int. Cl.
- *G05B 11/01* (2006.01)
- *G05B 19/18* (2006.01)
- *G06F 19/00* (2011.01)
- *G01B 11/14* (2006.01)

(52) U.S. Cl.
USPC ............ 700/14; 700/13; 700/56; 700/57; 700/58; 700/59; 700/60; 700/66; 700/69; 700/114; 700/157; 356/615; 356/614; 356/622

(58) Field of Classification Search
USPC ............ 700/13–14, 56–60, 66, 69, 114, 157; 356/614–615, 622
See application file for complete search history.

(56) References Cited

U.S. PATENT DOCUMENTS

| | | | |
|---|---|---|---|
| 5,148,591 A | 9/1992 | Pryor | |
| 5,267,143 A | 11/1993 | Pryor | |
| 5,517,311 A * | 5/1996 | Takeuchi et al. | 356/606 |
| 5,582,433 A | 12/1996 | Sisson | |
| 5,910,894 A * | 6/1999 | Pryor | 700/95 |
| 5,956,532 A * | 9/1999 | Arita | 396/72 |
| 6,266,437 B1 * | 7/2001 | Eichel et al. | 382/149 |
| 6,483,935 B1 | 11/2002 | Rostami et al. | |
| 8,076,978 B2 * | 12/2011 | Da Dalt et al. | 331/1 A |
| 2004/0007020 A1 * | 1/2004 | Kanno et al. | 65/29.11 |
| 2004/0061778 A1 * | 4/2004 | Yamane et al. | 348/86 |
| 2004/0167717 A1 * | 8/2004 | Buchanan et al. | 701/301 |
| 2004/0168407 A1 * | 9/2004 | Borghi et al. | 53/451 |
| 2006/0169682 A1 * | 8/2006 | Kainec et al. | 219/125.1 |
| 2007/0073439 A1 * | 3/2007 | Habibi et al. | 700/213 |
| 2007/0085905 A1 * | 4/2007 | Batson et al. | 348/92 |

OTHER PUBLICATIONS

Acromag, Introduction to Ethernet/IP , 2004 USA; 39 pages.

\* cited by examiner

*Primary Examiner* — Kavita Padmanabhan
*Assistant Examiner* — Jason Lin
(74) *Attorney, Agent, or Firm* — Quarles & Brady LLP

(57) ABSTRACT

A method for use in a part tracking system including a camera and a motion controller, the method comprising the steps of time synchronizing the motion controller and the camera at a trigger time when it is anticipated that a part is within the field of view of the camera, causing the camera to obtain an image, using the obtained image to determine an actual location of the part at the trigger time, comparing the actual location and the anticipated location of the part to identify a position difference and at the motion controller, using the position difference at the trigger time to adjust at least one operating characteristic of the automated system.

32 Claims, 10 Drawing Sheets

TIME SYNCHRONIZED REGISTRATION FEEDBACK

CROSS-REFERENCE TO RELATED APPLICATIONS

Not applicable.

STATEMENT REGARDING FEDERALLY SPONSORED RESEARCH OR DEVELOPMENT

Not applicable.

BACKGROUND OF THE INVENTION

The present invention relates to motion control systems and more specifically to control systems that use cameras to identify locations of parts during an automated process and uses the location information to modify process control where communication between a motion controller and cameras is via the Ethernet.

Automated systems are used in many different industries including manufacturing, shipping, testing, etc. In many applications parts (or products) are moved about within an environment and between locations using web based systems where, as the label implies, flexible webs are provided to transfer parts from one location to another. Here, in many cases, the webs are supported on spindles driven by servo motors to move the webs and parts supported thereon through a process from station to station until the process is complete. The servo motors are controlled by motor drives that control motor operating characteristics such as speed, acceleration and deceleration, etc. Coordination between drives is handled by a motion controller that synchronizes drive control in an appropriate fashion.

One problem with automated systems that employ web based part transfer systems is that the webs often slip relative to the supporting spindles. When a web slips, the locations of parts within the automated process (i.e., with respect to a drive system) cannot be precisely determined solely as a function of how the servos are controlled. In cases where webs slip relative to servo motors, some form of feedback is needed to ascertain the locations of parts with respect to the drive system and overall process.

One feedback solution for determining locations of parts in a web based drive system has been to provide photo sensors at various locations along the path of a web to detect part presence. Photo sensor feedback signals are provided to the motion controller which uses the position feedback signals to adjust drive system operation accordingly.

While photo sensors can provide needed position feedback, systems that include photo sensors have several drawbacks. First, in many applications the location of a part/product within a region has to be tracked precisely throughout the region. To track part location throughout a region a large number of photo sensors are needed and therefore the photo sensor solution can be expensive.

Second, for a photo sensor to sense part location, the sensor must be positioned very close to the path along which the part travels. For this reason the process associated with installing photo sensors is tedious and time consuming. Exacerbating matters, when a process has to be modified such that required part locations have to be changed, photosensor positions have to be altered which increases costs appreciably.

Third, many products are difficult to locate using photo sensors and therefore photo sensors are not suitable for many applications.

Thus, there is a need for a system that can be used to determine part locations in web based drive systems that overcomes the problems associated with systems that rely on photo sensors.

BRIEF SUMMARY OF THE INVENTION

It has been recognized that an Ethernet based machine vision system can be employed where a camera and a motion controller are time synchronized via a master clock and where the camera obtains images at trigger times known to the motion controller and when it is anticipated that a part will be within a field of view of the camera. Here, the motion controller can use a position difference between an actual part location within an obtained image and an anticipated part location at the trigger time to identify a position difference which is then used to perform some function. The function performed may include adjusting system operating characteristics to compensate for the position difference.

In at least some embodiments the motion controller may use a known part position at a first time prior to a trigger time to identify the trigger time and may then provide that trigger time via the Ethernet to the camera. When the trigger time is received, the camera may store that time and obtain a picture at the trigger time. In other embodiments the camera may simply be programmed to periodically obtain images of the camera's field of view where the periodicity is selected to coincide with times when it is anticipated that at least one part will be in the camera's field of view. In still other embodiments the camera may be programmed to take a rapid succession of images and when a part appears in at least one image, use that image to identify part location at a corresponding trigger time. Here, the camera may transmit the actual part location and the associated trigger time to the controller for further processing to generate the position difference.

In some embodiments the camera is programmed to identify the actual location of a part in an obtained image and transmit that information to the controller. In other embodiments the camera may be programmed to anticipate a specific part location (e.g., a center of a field of view) at a trigger time and may itself identify a position difference between the anticipated location and the actual part location which is then transmitted to the controller. In still other embodiments the camera may be programmed to simply transmit an image to the controller and the controller may be programmed to identify part location in the image and generate the position difference value for a trigger time associated with the image.

In some embodiments the motion control system may also obtain other inspection information from the cameras and store that information with an identity of the part associated therewith for subsequent purposes.

Consistent with the above, at least some embodiments include a method for use in a part tracking system including a camera and a motion controller, the method comprising the steps of time synchronizing the motion controller and the camera, at a trigger time when it is anticipated that a part is within the field of view of the camera, causing the camera to obtain an image, using the obtained image to determine an actual location of the part at the trigger time, comparing the actual location and the anticipated location of the part to identify a position difference and at the motion controller, using the position difference at the trigger time to adjust at least one operating characteristic of the automated system.

In some cases the method further includes providing an Ethernet link between the camera and the motion controller where the camera communicates with the motion controller via the Ethernet link and the step of time synchronizing includes providing a master clock that communicates with each of the motion controller and the camera via the Ethernet to synchronize. In some cases the method further includes identifying at least one automated system operating characteristic and using the operating characteristic to identify the trigger time.

In some embodiments the at least one automated system operating characteristic includes a first location of the part at a time prior to the trigger time. In some embodiments the motion controller identifies the trigger time, the method further including the steps of the motion controller transmitting the trigger time to the camera via an Ethernet link and the camera receiving and storing the trigger time. In some embodiments the camera determines the actual location of the part, the method further including the step of the camera transmitting the actual location of the part to the motion controller via the Ethernet link, the motion controller performing the comparing step.

In some embodiments the camera determines the actual location of the part, the method further including the step of the camera transmitting the actual location of the part to the motion controller via an Ethernet link. In some embodiments the trigger time is one time in a set of periodic time intervals at which it is anticipated that a part will be located within the field of view of the camera and wherein the camera obtains an image at each of the times in the set of periodic time intervals.

In some embodiments the camera transmits the actual location of the part to the motion controller via an Ethernet link. Some embodiments further include the steps of generating additional inspection data using the image of the part, transmitting the inspection data to the motion controller and storing the inspection data along with a part identifier for subsequent use.

Some embodiments include a method for use in an automated system that includes a camera and a motion controller, the method comprising the steps of, at the motion controller monitoring Ethernet communications for part position information generated by a camera using an image obtained at a trigger time and using the part position information and the associated trigger time to adjust at least one operating characteristic of the automated system.

In some cases the step of monitoring includes monitoring for part position information and an associated trigger time at which an image corresponding to the part position information was generated. In some cases the part position information includes an actual part location, the step of using the part position information including the motion controller comparing the actual part location to an anticipated part location to identify a position difference and using the position difference to adjust the at least one operating characteristic. Some embodiments further include the step of the motion controller identifying the anticipated part location as a function of operating characteristics of the automated system.

In some cases the part position information includes a position difference that is the difference between an actual part location in an obtained image and an anticipated part location in the obtained image. Some embodiments further include the step of the motion controller identifying the anticipated part location at the trigger time. Some embodiments further include the steps of the motion controller determining the trigger time and transmitting the trigger time to the camera via the Ethernet where the camera has a field of view that includes the anticipated location. Some embodiments further include the step of using a master clock to time synchronize the motion controller and the camera.

Other embodiments include a method for use in an automated system that includes a camera that has a field of view (FOV) and a motion controller, the method comprising the steps of providing an Ethernet link between the camera and the motion controller wherein the motion controller and the camera communicate via the Ethernet link, using a master clock to time synchronize the motion controller and the camera, at the motion controller (i) identifying a trigger time at which it is anticipated that a part will be at an anticipated location within the camera FOV, (ii) transmitting the trigger time to the camera, at the camera (i) after a trigger time is received, when the trigger time occurs, obtaining an image of the FOV, (ii) examining the image to identify the actual location of the part, (iii) transmitting the actual location to the motion controller, at the motion controller (iii) comparing the actual location to the anticipated location to generate a position difference.

Some embodiments further include the step of using the motion controller to adjust at least one operating characteristic of the automated system as a function of the position difference.

Some cases include a system for use in an automated environment, the system comprising a camera including a camera processor and having a field of view, the camera processor programmed to, at a trigger time when it is anticipated that a part is within the field of view of the camera, obtain an image, a processor programmed to use the obtained image to determine an actual location of the part at the trigger time, a processor programmed to compare the actual location and the anticipated location of the part to identify a position difference, a motion controller processor programmed to use the position difference at the trigger time to adjust at least one operating characteristic of the automated system and a processor that periodically time synchronizes the motion controller and the camera.

In some cases the processor that uses the obtained image to determine an actual location is the camera processor. In some cases the processor that compares to identify a position difference is the motion controller processor. In still other cases there may be an image processor that may comprise a component of the camera, a separate system such as a personal computer or the like, or may comprise a component of the motion controller. In still other embodiments the motion controller and image processor functions may be performed by different parts of a single processor.

Some embodiments include an apparatus for use in an automated system, the apparatus comprising a motion controller processor programmed to perform the steps of, monitoring Ethernet communications for part position information generated by a camera using an image obtained at a trigger time and using the part position information and the associated trigger time to adjust at least one operating characteristic of the automated system.

To the accomplishment of the foregoing and related ends, the invention, then, comprises the features hereinafter fully described. The following description and the annexed drawings set forth in detail certain illustrative aspects of the invention. However, these aspects are indicative of but a few of the various ways in which the principles of the invention can be employed. Other aspects, advantages and novel features of the invention will become apparent from the following detailed description of the invention when considered in conjunction with the drawings.

Figure 1:
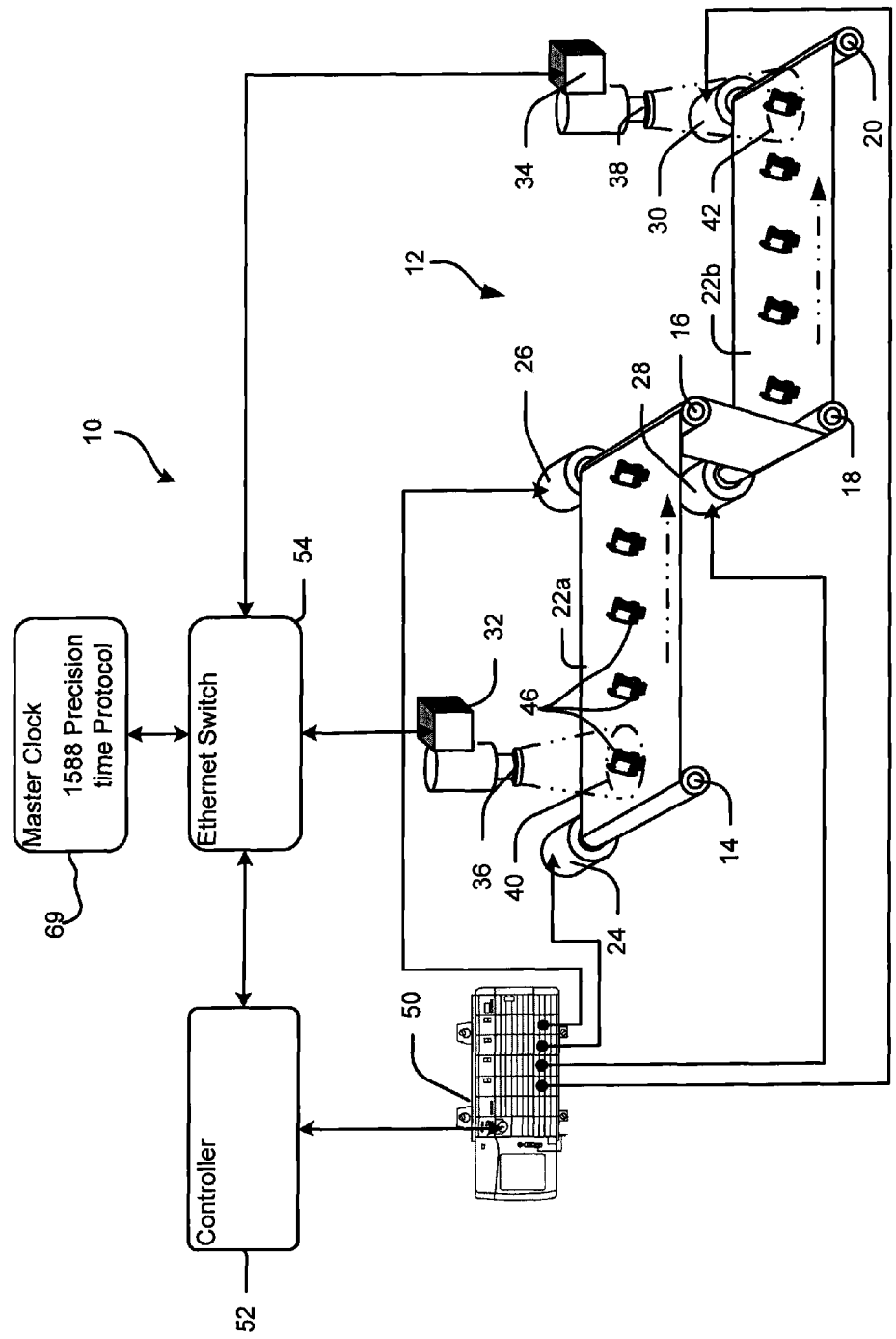
FIG. 1 is a schematic illustrating an exemplary motion control/automated system that may perform one or more of the methods described herein.

While the invention is susceptible to various modifications and alternative forms, specific embodiments thereof have been shown by way of example in the drawings and are herein described in detail. It should be understood, however, that the description herein of specific embodiments is not intended to limit the invention to the particular forms disclosed, but on the contrary, the intention is to cover all modifications, equivalents, and alternatives falling within the spirit and scope of the invention as defined by the appended claims.

DETAILED DESCRIPTION OF THE INVENTION

The various aspects of the subject invention are now described with reference to the annexed drawings, wherein like numerals refer to like or corresponding elements throughout. It should be understood, however, that the drawings and detailed description relating thereto are not intended to limit the claimed subject matter to the particular form disclosed. Rather, the intention is to cover all modifications, equivalents, and alternatives falling within the spirit and scope of the claimed subject matter.

As used herein, the terms "component," "system" and the like are intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on computer and the computer can be a component. One or more components may reside within a process and/or thread of execution and a component may be localized on one computer and/or distributed between two or more computers.

The word "exemplary" is used herein to mean serving as an example, instance, or illustration. Any aspect or design described herein as "exemplary" is not necessarily to be construed as preferred or advantageous over other aspects or designs.

Furthermore, the disclosed subject matter may be implemented as a system, method, apparatus, or article of manufacture using standard programming and/or engineering techniques to produce software, firmware, hardware, or any combination thereof to control a computer or processor based device to implement aspects detailed herein. The term "article of manufacture" (or alternatively, "computer program product") as used herein is intended to encompass a computer program accessible from any computer-readable device, carrier, or media. For example, computer readable media can include but are not limited to magnetic storage devices (e.g., hard disk, floppy disk, magnetic strips . . . ), optical disks (e.g., compact disk (CD), digital versatile disk (DVD) . . . ), smart cards, and flash memory devices (e.g., card, stick). Additionally it should be appreciated that a carrier wave can be employed to carry computer-readable electronic data such as those used in transmitting and receiving electronic mail or in accessing a network such as the Internet or a local area network (LAN). Of course, those skilled in the art will recognize many modifications may be made to this configuration without departing from the scope or spirit of the claimed subject matter.

Referring now to the drawings wherein like reference numerals correspond to similar elements throughout the several views and, more specifically, referring to FIG. 1, the present invention will be described in the context of an exemplary motion control and machine vision or automated system 10 that includes, among other components, a transfer line 12, one or more cameras 32, 34, a drive module 50, a motion controller 52 and a master clock 69. Transfer line 12 includes a plurality of servo motors 24, 26, 28 and 30 and a material web including sections identified by numerals 22a and 22b. The transfer line 12 is used to move parts or product items 46 between stations that facilitate a machining process or an inspection process or the like. To this end, the servo motors 24, 26, 28 and 30 are controlled to rotate spindles 14, 16, 18 and 20 associated therewith on which the web 22a, 22b is mounted. As the spindles rotate, the web moves along. Web speed can be increased and decreased by controlling the servo motors. As described above, in some cases, web 22a, 22b may slip on the supporting spindles so that the web does not keep up with spindle rotation.

Referring still to FIG. 1, servo motors 24, 26, 28 and 30 are each linked to drive module 50 which provides control signals thereto for controlling the motors. Motion controller 52 is linked to drive module 50 and provides control signals thereto for coordinating operation of the servo motors and other machining and/or inspection equipment that facilitates the machining and/or inspection process. Thus, controller 52 can speed up or slow down the servo motors simultaneously or at different rates to adjust web movement, web tension, etc.

Referring once again to FIG. 1, a plurality of cameras including cameras 32 and 34 are provided for monitoring part location within the system 10. Here, exemplary camera 32 includes a lens 36 that has field of view 40 that is directed toward one portion of web 22a while camera 34 has a lens 38 that has a field of view 42 that is directed to a second portion of the web 22b downstream from the portion viewed by camera 32. Cameras 32 and 34 are linked to motion controller 52 via a communication link or network. In the illustrated embodiment, the communication link or network includes an Ethernet which is represented by Ethernet switch 54. Thus, in at least some embodiments motion controller 52 can communicate with either of cameras 32 or 34 and either of cameras can communicate with motion controller 52 via Ethernet 54.

In at least some embodiments, each camera 32 and 34 includes its own camera processor that is programmed to examine images generated by the camera and to identify instances of parts in the images and the locations of those parts in the images. In addition, in at least some embodiments, each of the camera processors is programmed to transmit location information associated with identified parts to motion controller 52. Here, in some embodiments, the location information may include actual location of a part within the camera's field of view. In other embodiments, the location information may include actual location of a part within the overall system 10. In still other embodiments, the cameras may be programmed to transmit information that can be used by motion controller 52 to identify the location of a part within system 10. For example, in some embodiments, the cameras may be programmed to transmit the actual obtained images to the motion controller 52 and the motion controller 52 may be programmed to perform the process of identifying the location of a part in an obtained image and thereafter to determine the location of the part within the overall system 10.

In still other embodiments a separate image processor (not illustrated) may be provided for determining part location within obtained images and that image processor may then provide that information to the motion controller.

Referring yet again to FIG. 1, master clock 69 is linked to Ethernet 54 and facilitates time synchronization between motion controller 52 and each of cameras 32 and 34 in a manner that will be described in greater detail below.

Referring again to FIG. 1, operating characteristics of transfer line 12 such as distances between locations thereaolong can be provided to motion controller 52. For example, the distance between a first location of a part located centrally within the field of view of camera 32 and the location of a part centrally located within the field of view of camera 34 can be precisely determined and provided to motion controller 52. Here, because motion controller 52 controls transfer line 12 and therefore knows the speed(s) thereof during transfer processes, where motion controller 52 is provided the operating characteristics of transfer line 12, if motion controller 52 knows a first time at which a part is at the first location centrally located with respect to the field of view of first camera 32, motion controller 52 can estimate a time at which the part should be at a specific anticipated location (e.g., a central location) within the field of view 42 of camera 34. For instance, if the distance between the central locations of the first and second fields of view 40 and 42 is 100 feet and transfer line 12 is moving along at 10 feet per second, motion controller 52 can determine that a part should move from the central location in field of view 40 to the central location in the field of view 42 in precisely ten seconds.

However, as explained above, because transfer line webs like web 22a, 22b tend to slip during transfer, often the estimated time of travel between two locations within the system 10 will not be accurate due to slippage. Thus, for instance, referring to FIG. 2, where an anticipated location at a specific time or instant is shown in phantom at $L_{ant}$, an actual part location $L_{act}$ may result where there is a position difference ΔL between the two locations $L_{ant}$ and $L_{act}$. In at least some embodiments, motion controller 52 may use the position difference ΔL as feedback for adjusting operation of the overall system 10 by either adjusting servo motor speed or operation of other system machines or inspection devices along transfer line 12.

Referring yet again to FIG. 1, each of cameras 32, 34, etc., and motion controller 52 have internal device clocks that track time. As well known in the controls art, often device clocks will become unsynchronized during operations. In order for the camera feedback system described above to work properly, the motion controller and camera device clocks have to be precisely synchronized. Thus, for instance, where a camera clock is ahead of the controller clock by a fraction of a second, referring again to FIG. 2, the camera may obtain an image with a part at actual location $L_{act}$ at a camera time T1, determine part location, and transmit the location $L_{act}$ to motion controller 52 where, if the image were obtained a fraction of a second later at the controller time T1, the actual part location would have been precisely aligned with the anticipated location $L_{ant}$. In this case motion controller 52 would identify a position difference ΔL solely because of the timing difference and unneeded and undesirable compensating control would occur.

Figure 3:
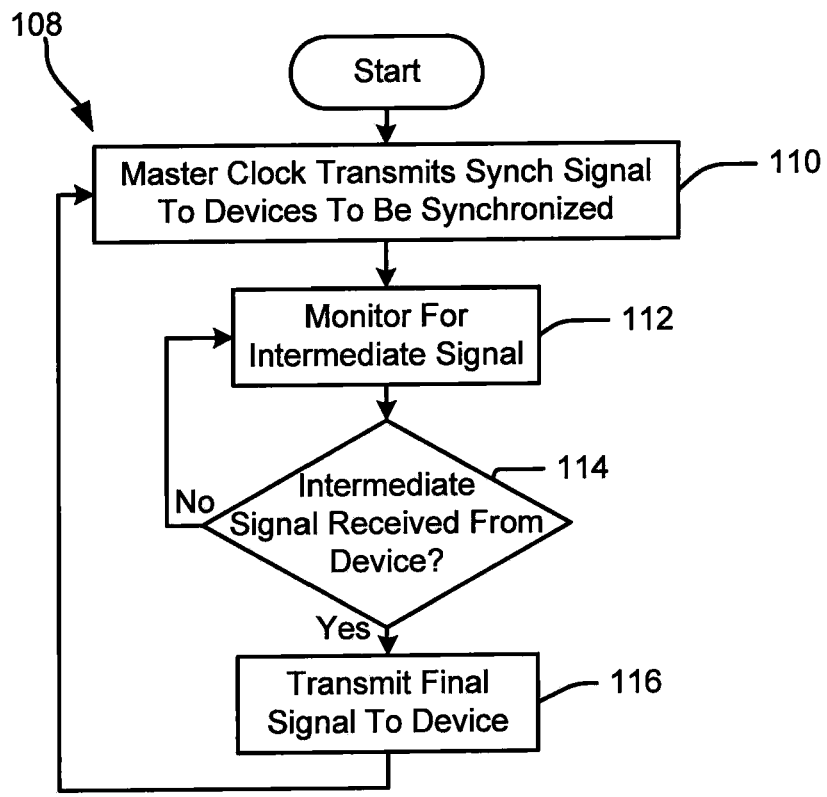
FIG. 3 is a flow chart illustrating a process that may be performed by the master clock of FIG. 1 to synchronize various devices including the motion controller and the camera shown in FIG. 1.

To maintain synchronization between motion controller 52 and cameras 32 and 34, in at least some embodiments, master clock 69 facilitates periodic synchronization processes. To this end, referring also to FIGS. 3 and 4, processes performed by master clock 69 and each of the motion controller 52 and camera 32 processors, respectively, are illustrated whereby synchronization occurs. In FIG. 3, the synchronization process 108 for master clock 69 begins at block 110 where master clock 69 transmits a sync signal to devices linked to Ethernet 54 that are to be synchronized. In FIG. 1, the sync signal is transmitted to each of motion controller 52 and cameras 32 and 34. After transmitting the sync signal, clock 69 monitors Ethernet 54 for an intermediate return signal from each of the controller and the cameras.

Figure 4:
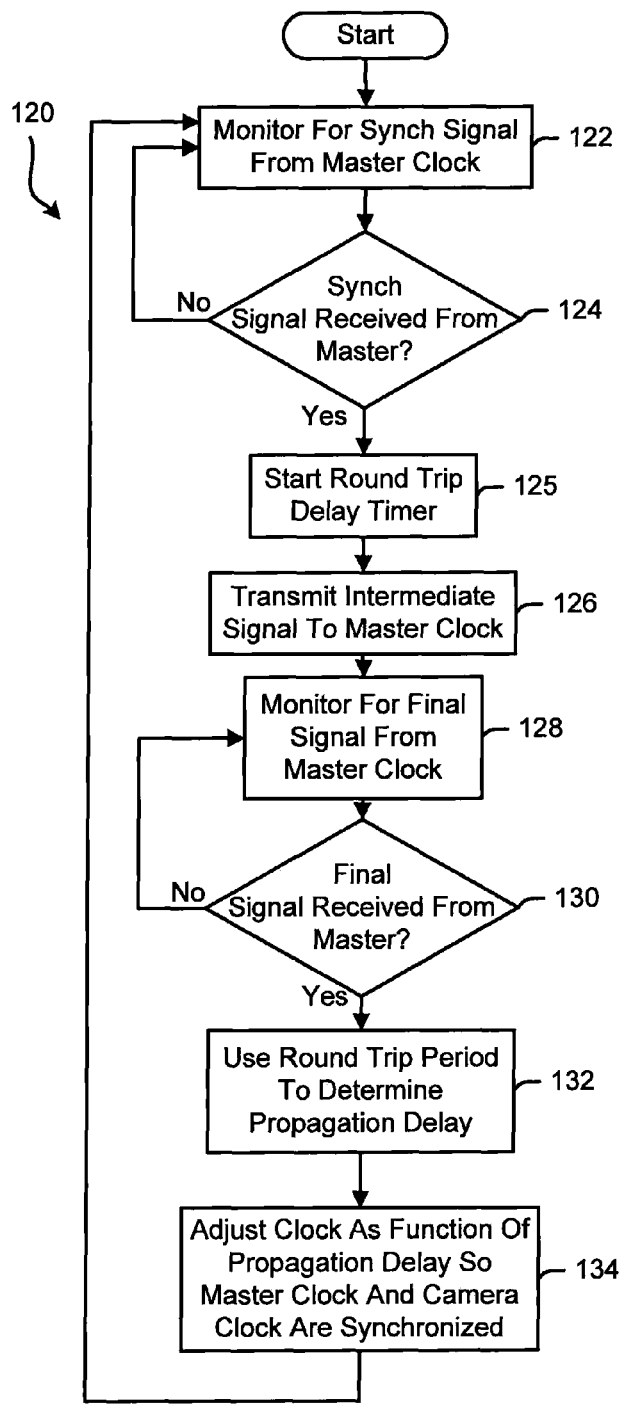
FIG. 4 is a flow chart illustrating a process that may be performed by each of the motion controller and the cameras in FIG. 1 to synchronize with the master clock in FIG. 1.

Referring still to FIGS. 1, 3 and 4, the synchronization process 120 for each of motion controller 52 and cameras 32 and 43 begins at block 122 where the respective device processor monitors for a sync signal from master clock 69. At block 124, where no sync signal is received, control passes back to block 122 and the monitoring process continues. Once a sync signal is received at block 124, control passes to process block 125 where the device (e.g., motion controller 52 or one of the cameras 32 or 34) processor starts a round trip delay timer. At block 126, the device processor transmits an intermediate signal back to master clock 69 after which the device again monitors Ethernet link 54 for a final signal from master clock 69.

Referring once again to FIG. 3, when the intermediate signal is received at block 114, control passes to block 116 where master clock 69 transmits a final signal to a device from which an intermediate signal was received. Here, the final signal may include an instantaneous master clock time.

Referring once again to FIGS. 1 and 4, once a final signal is received at block 130, the device processor stops the round trip delay timer and uses the round trip period to determine an Ethernet propagation delay between the master clock 69 and the device. At block 134, the device uses the propagation delay and the master clock's instantaneous time to reset the devices internal clock and therefore synchronize with the master clock 69. Here, where each of the cameras 32 and 34 and motion controller 52 synchronize with the master clock, all three of the motion controller 52, camera 32 and camera 34 clocks are precisely synchronized.

Although master clock 69 is shown as a separate device in FIG. 1, it should be appreciated that motion controller 52 may run its own clock synchronization routine to synchronize with the camera clocks in a fashion similar to that described above.

Once the controller 52 and cameras 32 and 34 are precisely time synchronized, various inventive methods can be performed whereby motion controller 52 can use position differences like the one described above with respect to FIG. 2 to control the transfer line 12 and other associated machines and inspection system components. To this end, an exemplary process including the steps shown in FIGS. 5 and 6 may be performed by the motion controller 52 and at least one of the cameras (e.g. 34) in FIG. 1. Method 160 shown in FIG. 5 is generally performed by the motion controller 52 while the method 140 in FIG. 6 is performed by camera 34 in FIG. 1

Figure 2:
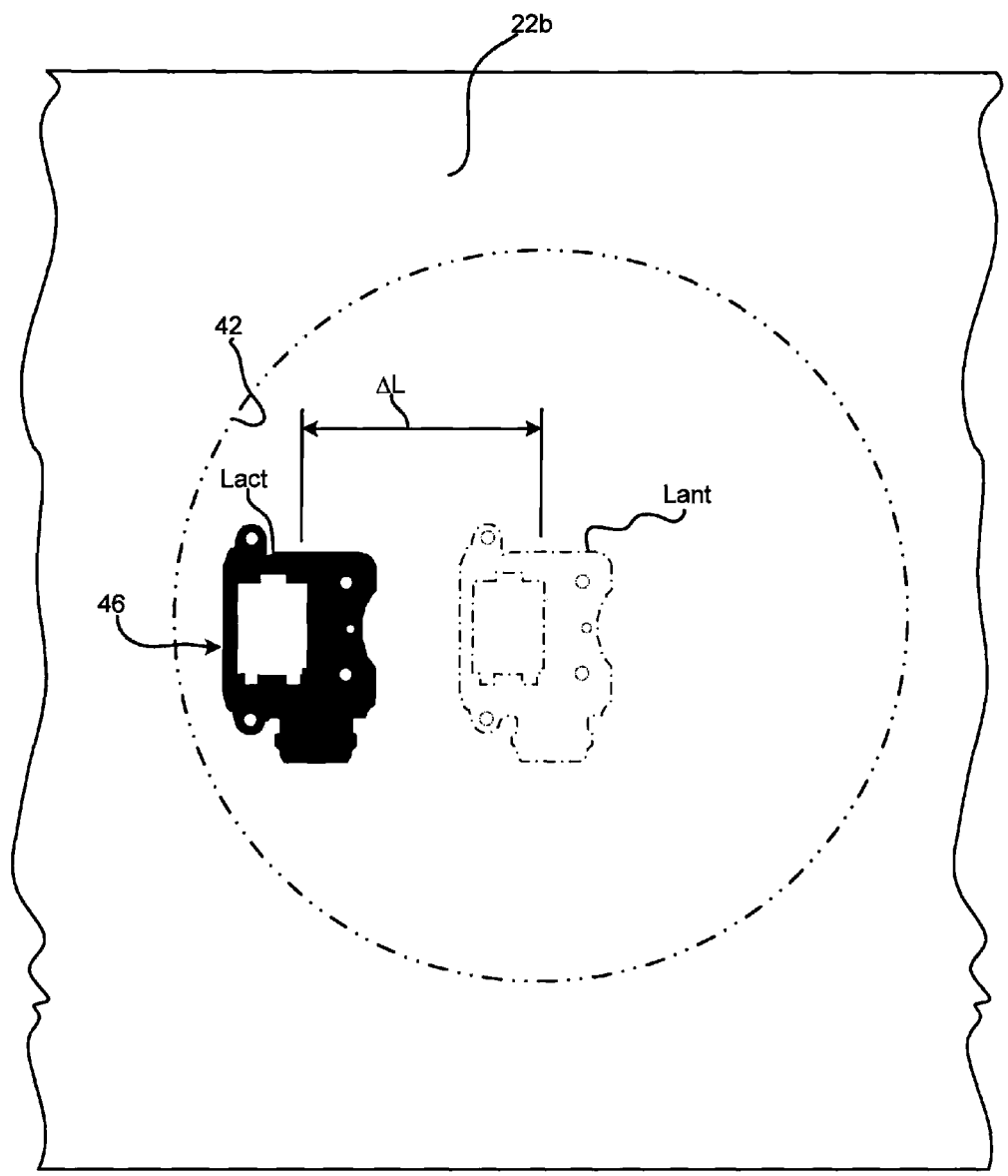
FIG. 2 is a schematic illustrating an exemplary part within a camera field of view in an actual location and in an anticipated location.
Figure 5:
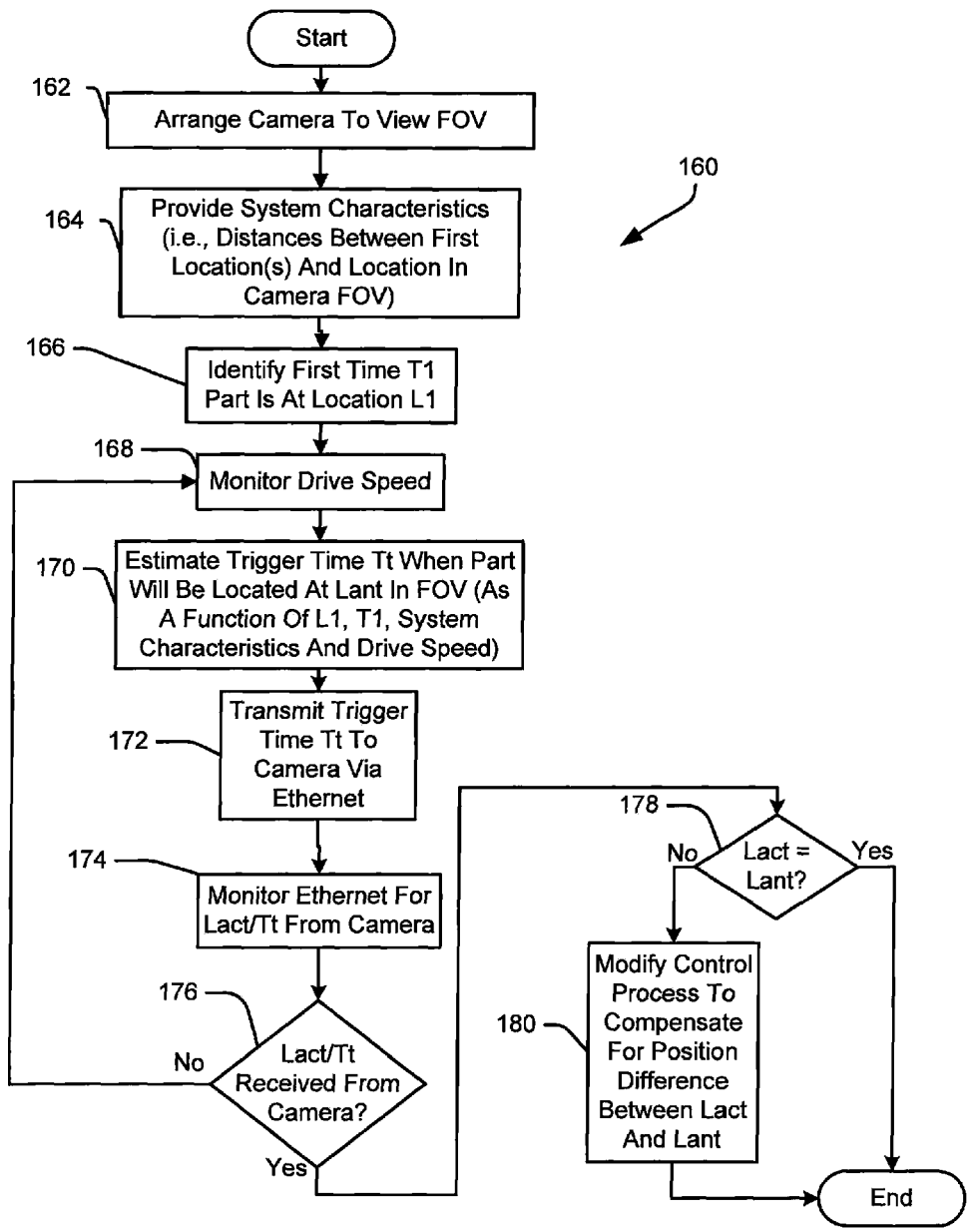
FIG. 5 is a flow chart illustrating a process performed by the motion controller in FIG. 1 for determining the amount of web slippage that occurs within the system of FIG. 1.
Figure 6:
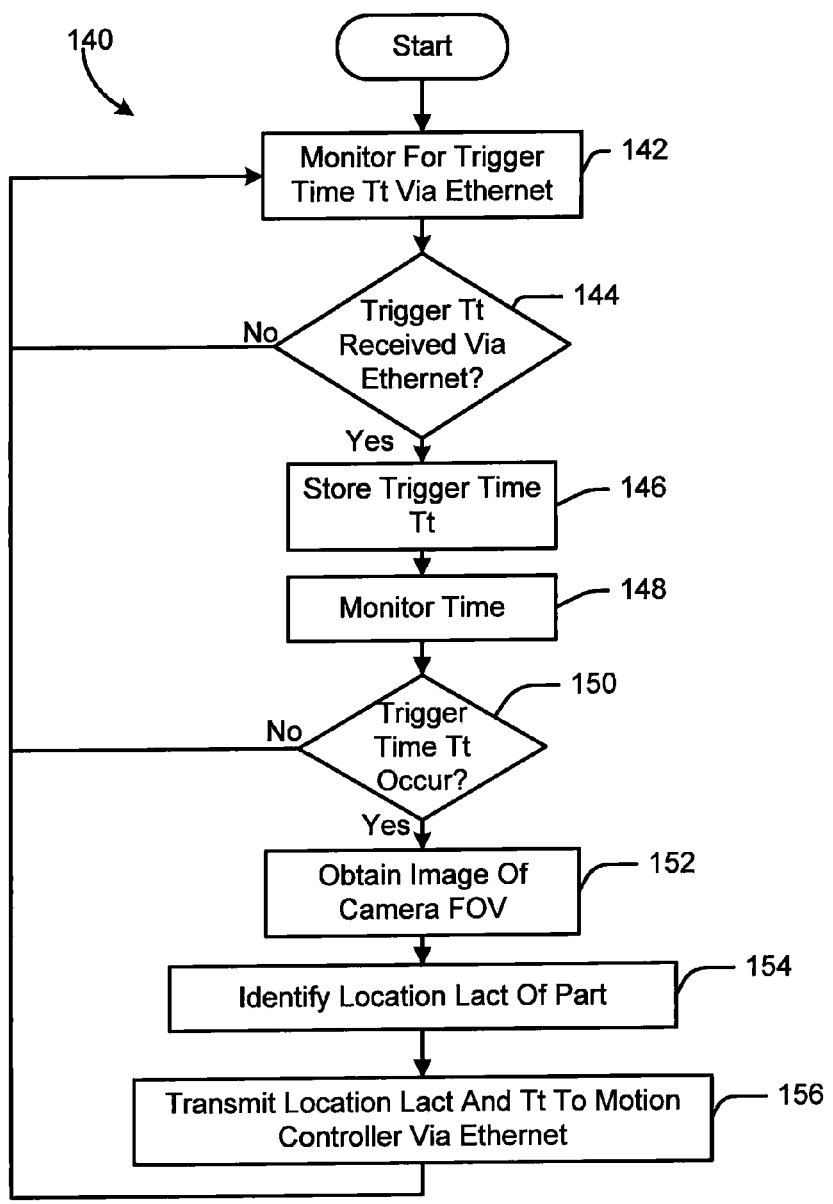
FIG. 6 is a flow chart illustrating a process performed by one of the cameras shown in FIG. 1 that is complimentary with respect to the process shown in FIG. 5.

In general, the process shown in FIGS. 5 and 6 requires controller 52 to estimate a trigger time at which a specific part will be at an anticipated location within field of view 42 of camera 34 as a function of a first location of the part at a first time prior to the trigger time as well as other operating characteristics such as drive speed and the distance between the first location and the anticipated location. After the trigger time is estimated and prior to occurrence of the trigger time, motion controller 52 transmits the trigger time to camera 34 which stores that time. When the trigger time occurs, camera 34 obtains an image of the portion of transfer line 12 associated with the camera's field of view and identifies the actual location of the specific part within the field of view. The actual location is transmitted back to motion controller 52 via Ethernet 54. Motion controller 52 then compares the actual location to the anticipated location and identifies a position difference $\Delta L$ as shown in FIG. 2. Based on the position difference $\Delta L$, motion controller 52 may perform any of several different functions including adjusting motor speed to compensate for web slippage.

Referring still to FIG. 1 and now also to FIGS. 5 and 6, at block 162 in FIG. 5, camera 34 is arranged so that its field of view is directed at a specific location along transfer line 12. At block 164, system characteristics are provided to motion controller 52 including a distance between a first location L1 and an anticipated location within the camera's field of view 42. Here, for instance, the first location L1 may correspond to a central location within field of view 40 of first camera 32. In other embodiments, the first location may be associated with a photo sensor or other type of position sensing device such that controller 52 can precisely determine a first time T1 at which the part is at the first location L1. In still other embodiments the first location may be associated with a location at which a robot or machine set a part or most recently performed same operation (e.g., tooling, attachment of a feature, etc.) on the part on the web. At block 166, controller 52 identifies a first time T1 that a part is at first location in L1. At block 168, controller 52 monitors the drive speeds that the controller is commanding.

Referring still to FIGS. 1, 5 and 6, at block 170 controller 52 uses the first time T1, a known distance between the first location L1 and the anticipated location $L_{ant}$ and the drive speeds to estimate a trigger time $T_t$ when the part will be located at the anticipated location $L_{ant}$ within the camera's field of view 42. At block 172, controller 52 transmits a data packet targeting camera 34 that includes the trigger time $T_t$ via Ethernet 54.

Referring to FIG. 6, at block 142, camera 34 monitors Ethernet 54 for the packet including trigger time $T_t$. Once a trigger time is received at block 144, the process passes to process block 146 where camera 34 stores trigger time $T_t$ and at block 148 camera 34 monitors its clock time. At block 150, when trigger time $T_t$ occurs, control passes to block 152 where camera 34 obtains an image of field of view 42. At block 154, camera 34 identifies the actual location $L_{act}$ of the part and at block 156, camera 34 transmits actual location $L_{act}$ and associated trigger time $T_t$ to motion controller 52 via Ethernet 54.

Referring again to FIGS. 1 and 5, at block 174, controller 52 monitors the Ethernet for the actual location $L_{act}$ and time $T_t$ from camera 34. Once the actual location is received from camera 34 at block 176, control passes to block 178 where controller 52 compares the $L_{act}$ to the $L_{ant}$ at trigger time $T_t$. Where the actual location is equal to or substantially equal to the anticipated location at block 178, the process ends. Where the actual location is not equal to the anticipated location, control passes from block 178 to block 180 where controller 52 modifies the control process to compensate for the position difference $\Delta L$ between the actual and anticipated locations.

In some embodiments it is contemplated that the camera, while knowing the trigger time $T_t$, may in fact only obtain an image at an actual time $T_{acq}$ that is approximately at the trigger time $T_t$. Here, the processor would determine the actual location $L_{act}$ and acquired time $T_{acq}$ to the motion controller. The controller processor would use the acquired time and other operating characteristics to identify an anticipated location $L_{ant}$ at time $T_{acq}$ and would then compare the acquired and anticipated location as described above.

Referring once again to FIG. 5, at block 176, prior to receiving actual location information from a camera, control loops backup the block 168 where the process including blocks 168, 170, 172 and 174 are repeated. Thus, in at least this embodiment, trigger time $T_t$ may be updated several times between the first time T1 and the time at which an image of a part within field of view 42 is obtained. When a new trigger time is transmitted to the camera 34, in FIG. 6, the new trigger time is received at block 144 and is used to replace the previous trigger time at block 146. This trigger time replacement feature enables motion controller 52 to update a camera trigger time when drive speeds are altered for any reason.

Referring again to FIG. 6 and, more specifically to block 156, in at least some embodiments it is important that when actual location $L_{act}$ is transmitted to the motion controller 52, the associated trigger time $T_t$ is included with the transmission. Here, it has been recognized that an updated trigger time may be transmitted to camera 34 that is not received thereby prior to a previously transmitted trigger time occurring. Where the trigger time $T_t$ is transmitted with the associated actual location $L_{act}$, motion controller 52 can use the anticipated location $L_{ant}$ associated with the trigger time $T_t$ to identify the position difference $\Delta L$ as opposed to using an anticipated location associated with the later trigger time that was not received by the camera. In some embodiments where drive speed changed prior to the trigger time $T_t$ used by a camera, motion controller 52 may apply some criteria to discern whether or not a position difference $\Delta L$ is likely accurate and therefore, whether or not the position difference $\Delta L$ should be used. In other embodiments where drive speed is changed prior to a trigger time $T_t$ used by a camera, controller 52 may itself compensate for the speed change and identify an updated anticipated part location for comparison to the actual part location $L_{act}$ received from a camera so that a resulting position difference $\Delta L$ is more accurate.

In other embodiments it is contemplated that camera 34 may be programmed to simply obtain images at periodic trigger times that are pre-calculated to coincide with times when different parts are within the field of view 42 of camera 34. Thus, for instance, it may be that parts are spaced apart on the transfer line 12 and the transfer line 12 is moving at a rate such that, absent slippage, a different part will be at an anticipated location $L_{ant}$ within camera field of view 42 every four seconds. Here, camera 34 may be programmed to obtain an image of its field of view every four seconds when it is anticipated that a part will be at the center of the camera's field of view. When an image is obtained, camera 34 may be programmed to identify the location of the part within the obtained image and transmit that information via Ethernet 54 to motion controller 52. When controller 52 receives the location information, motion controller 52 may compare the part location information to the anticipated location $L_{ant}$ and adjust system operation in a manner similar that described above.

Figure 7:
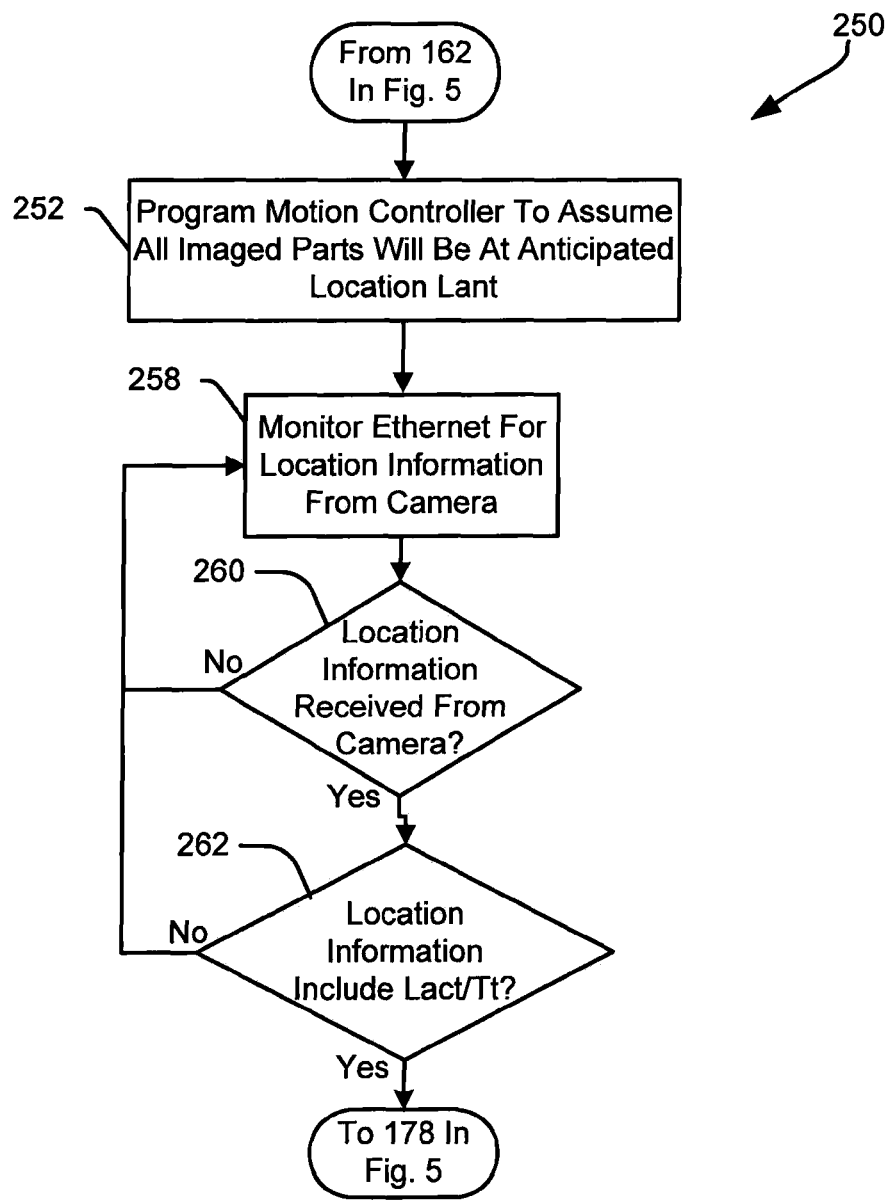
FIG. 7 is a flow chart illustrating a second exemplary sub-process that may be substituted for a portion of the process shown in FIG. 5 to achieve a similar result to the FIG. 3 process.
Figure 8:
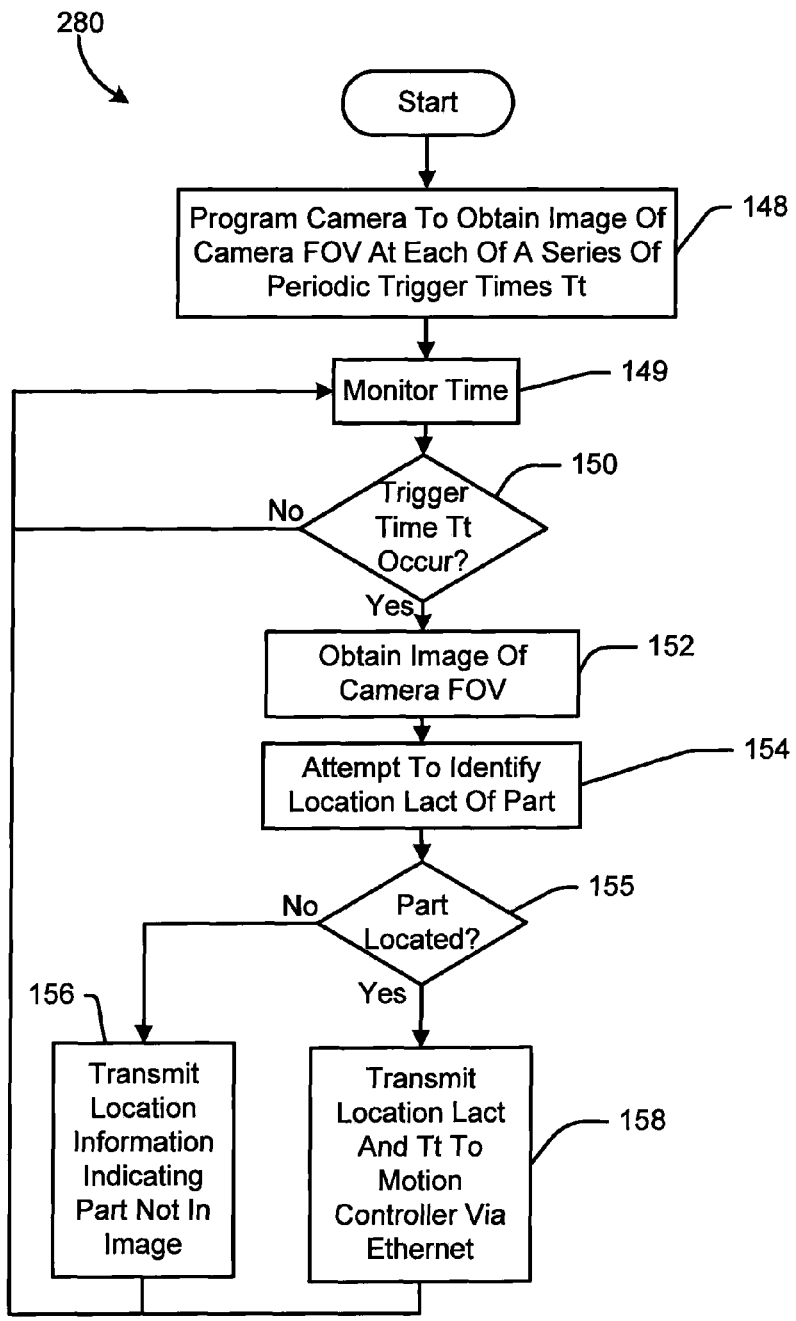
FIG. 8 is a flow chart illustrating a process that may be performed by one of the cameras shown in FIG. 1 where the process is complimentary to the process shown in FIG. 7.

Consistent with the above comments, FIG. 7 illustrates a sub-process 250 that may be performed by the motion controller 52 (see FIG. 1) that may be substituted for a portion of the process 160 shown in FIG. 5. Referring also to FIG. 5, after block 162, control may pass to block 252 in FIG. 7 where controller 52 is programmed to assume that all parts will be within a single anticipated location when camera 34 obtains images thereof. Referring also to FIG. 8, a process 280 that compliments the sub-process of FIG. 7 and is performed by camera 34 is illustrated. At block 148, camera 34 is programmed to obtain an image of the camera's field of view at each of a series of periodic trigger times $T_t$. Consistent with the above example, here, it will be assumed that camera 34 obtains an image every four seconds when it is anticipated that a part will be located centrally with respect to the camera's field of view 42 (see $L_{ant}$ in FIG. 2). At block 149, camera 34 monitors its internal clock time and at block 150, where a trigger time $T_t$ occurs, control passes to block 152 where the camera obtains an image of its field of view 42. At block 154, camera 34 attempts to identify the actual part location $L_{act}$ within the obtained image. Where a part is located at block 155, control passes to block 156 where camera 34 transmits the actual part location $L_{act}$ and the associated trigger time $T_t$ to motion controller 52 via Ethernet 54. Control next passes back up to block 149 where camera 34 continues to monitor for a next trigger time occurrence. At block 155, when camera 34 cannot identify the location of a part within the obtained image, control passes to block 158 where camera 34 transmits location information to controller 52 indicating that there was no recognizable part in the obtained image.

Referring once again to FIGS. 1 and 7, controller 52 monitors the Ethernet 54 for location information from camera 34 at block 258. Once location information is received at block 260, control passes to block 262 where controller 52 determines if the location information includes an actual location and target time. Where location information does not include an actual location, control passes back to block 258 where controller 52 continues to monitor for location information from camera 34. Where the location information does include an actual location $L_{act}$ and an associated target time $T_t$ at block 262, control passes to block 178 in FIG. 5 where the process described above continues and the motion controller 52 may or may not adjust system operation.

In yet another exemplary system that is a hybrid of the two systems described above, camera 34 may be programmed to regularly obtain images at periodic time intervals where the time intervals may be adjustable by motion controller 52 as a function of system operating characteristics. For instance, where transfer line 12 in FIG. 1 operates at 100 feet per second during a first long period and camera obtains and examines an image every 4 seconds, where motion controller 52 slows down the devices to 50 feet per second, motion controller 52 may transmit a packet to camera 34 instructing the camera processor to obtain images only every eight seconds.

In still other embodiments where motion controller 52 changes line speeds, camera 34 may still obtain images at a single rate and transmit actual part location data for each obtained image, for each image that includes a part or for a sub-set of images, and the motion controller 52 may be programmed to use only a subset of the location information obtained.

In at least some embodiments it is contemplated that controller 52 may know which specific part appears in each image obtained by camera 34 or, indeed, other cameras that are included in system 10. To this end, when a part is placed on a transfer line 12, controller 52 may know the identity of the part and may track that part throughout the entire transfer line process. Here, camera 34 may be programmed to provide, in addition to an actual part location and a trigger time, other inspection data to controller 52 for each part imaged. Other exemplary inspection information may include part characteristics such as dimensions, color, orientation, etc. In these cases, when controller 52 receives other inspection data or information, the controller 52 may store that other inspection data along with the identity of the associated part for subsequent use.

Figure 9:
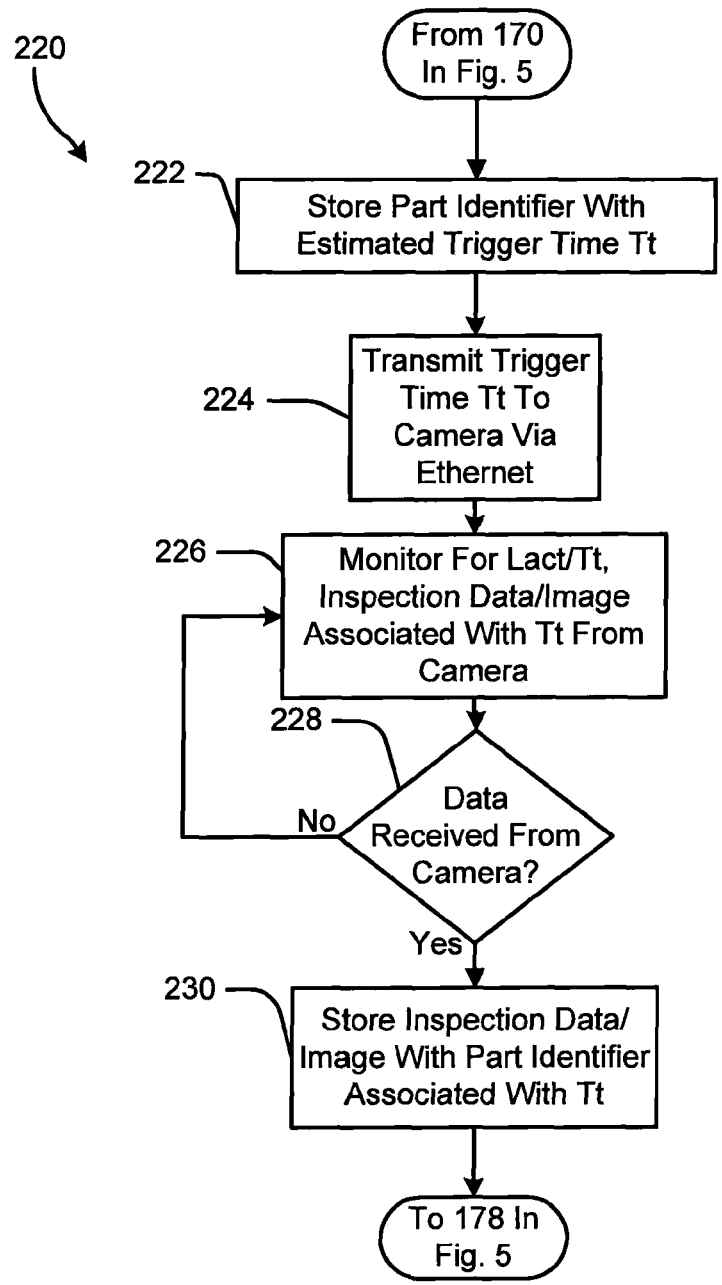
FIG. 9 is a flow chart illustrating a sub-process that may be a substitute for a portion of the process shown in FIG. 5 whereby the motion controller in FIG. 1 receives and stores inspection data with a part identifier.
Figure 10:
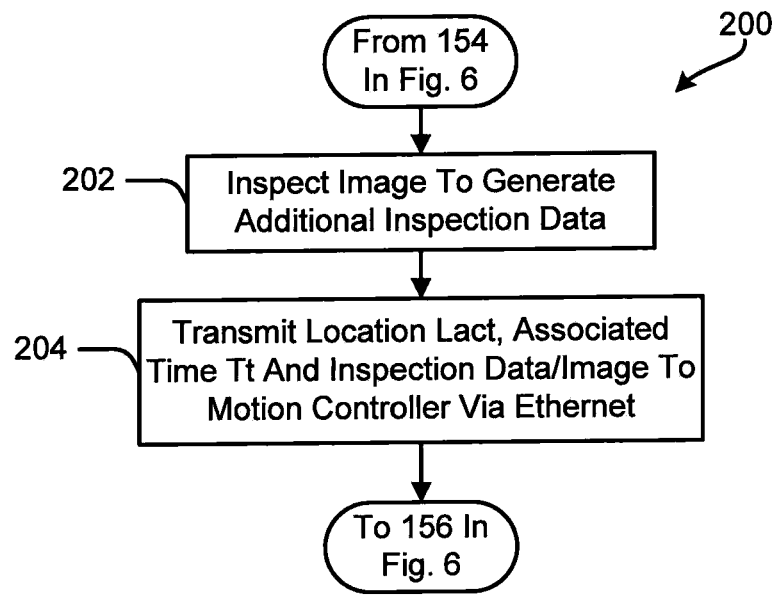
FIG. 10 is a sub-process that may be substituted for a portion of the process shown in FIG. 6 whereby one of the cameras in FIG. 1 generates and transmits inspection data to the motion controller of FIG. 1 for storage with a part identifier.

Referring now to FIGS. 9 and 10, sub-processes 220 and 200 that may be performed by controller 52 and camera 34, respectively, and that may be substituted for portions of the processes 160 and 140 shown FIGS. 5 and 6, respectively, are illustrated whereby the camera 34 obtains additional inspection information from each part imaged, provides that additional inspection information to controller 52, and controller 52 stores that additional inspection information along with a part identifier for the associated part. Referring also to FIGS. 1 and 5, after block 170 in FIG. 5, control may pass to block 222 in FIG. 9 where controller 52 stores a part identifier with trigger time $T_t$ as identified at block 170. At block 224, controller 52 transmits trigger time $T_t$ to camera 34 via Ethernet 54. At block 226, controller 52 monitors the Ethernet for data from camera 34 related to the part associated with the identifier stored at block 222. Here, the related data may include an actual part location $L_{act}$ and an associated trigger time $T_t$, other inspection data, the actual image of the part obtained by camera 34, etc. At block 228, when data is received from camera 34, control passes to block 230 where controller 52 stores the inspection data and/or image with the part identifier associated with trigger time $T_t$ after which control passes back to block 178 in FIG. 5 where the process described above continues.

Referring again to FIGS. 1 and 6 and also to FIG. 10, after block 154 control may pass to block 202 in FIG. 10. At block 202, camera 34 inspects the obtained image to generate additional inspection data and at block 204 camera 34 transmits obtained information and may also transmit the obtained image to motion controller 52.

The particular embodiments disclosed above are illustrative only, as the invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular embodiments disclosed above may be altered or modified and all such variations are considered within the scope and spirit of the invention. Accordingly, the protection sought herein is as set forth in the claims below.

Thus, the invention is to cover all modifications, equivalents, and alternatives falling within the spirit and scope of the invention as defined by the following appended claims. For example, in some embodiments motion controller 52 may receive a camera image from camera 34 and may perform the part locating process thereon. As another example, in at least some embodiments the camera 34 processor may be programmed to know an anticipated part location and to identify the position difference ΔL which is then transmitted to the motion controller 52 for subsequent use. In some embodiments the part location process may be performed by an image processor that is separate from the camera and the motion controller.

In addition, in some embodiments cameras may not transmit trigger times associated with actual locations or position information. For instance, where motion controller 52 may be programmed to know trigger times and to assume that the next received actual location information from a camera will be associated with the most recent trigger time and operate accordingly.

Moreover, in at least some embodiments camera 34 may be programmed to obtain a rapid succession of images (e.g., one every fraction of a second), search for a part in the image and then, where multiple images include a single part, to select one of the images for which to transmit actual part location to the motion controller 52 along with an associated image trigger time. In this case motion controller 52 would use the trigger time and line operating characteristics (e.g., speed, known part location at a previous time T1, etc.) to identify an anticipated location and would then generate the position difference accordingly.

Furthermore, in some embodiments, where slippage is excessive so that an image that should include a part in fact does not, camera 34 may be programmed to quickly obtain one or a series of additional images where each image is associated with a different trigger time. Here, the camera would attempt to identify a part location in each of the additional images and when a location is identified, would transmit the actual part location and associated trigger time to motion controller 52 for subsequent use as described above. In this way, even if excessive slippage were to occur part location could still be identified and used as a slippage feedback by the motion controller.

To apprise the public of the scope of this invention, the following claims are made:

1. A method for use in a part tracking system including a camera having a field of view and a motion controller, the method comprising the steps of:
   identifying an initial location of the part where the initial location is outside and spaced apart from the field of view of the camera;
   using the initial location of the part to identify a predetermined trigger time at which it is anticipated that the part will be at an anticipated location within the field of view of the camera;
   time synchronizing the motion controller and the camera;
   causing the camera to obtain an image at the predetermined trigger time at which it is anticipated that the part will be at an anticipated location within the camera field of view;
   using the image obtained by the camera to determine an actual location of the part at the predetermined trigger time;
   comparing the actual location and the anticipated location of the part to identify a position difference; and
   at the motion controller, using the position difference at the predetermined trigger time to adjust at least one operating characteristic of an automated system.

2. The method of claim 1 further including the step of providing an Ethernet link between the camera and the motion controller where the camera communicates with the motion controller via the Ethernet link and wherein the step of time synchronizing includes providing a master clock that communicates with each of the motion controller and the camera via the Ethernet to synchronize.

3. The method of claim 1 further including the steps of identifying at least one automated system operating characteristic and using the operating characteristic to identify the predetermined trigger time.

4. The method of claim 3 wherein the motion controller identifies the trigger time, the method further including the steps of the motion controller transmitting the predetermined trigger time to the camera via an Ethernet link and the camera receiving and storing the predetermined trigger time.

5. The method of claim 4 wherein the camera determines the actual location of the part, the method further including the step of the camera transmitting the actual location of the part to the motion controller via the Ethernet link, the motion controller performing the comparing step.

6. The method of claim 1 wherein the camera determines the actual location of the part, the method further including the step of the camera transmitting the actual location of the part to the motion controller via an Ethernet link.

7. The method of claim 1 wherein the predetermined trigger time is one time in a set of periodic time intervals at which it is anticipated that a part will be located within the field of view of the camera and wherein the camera obtains an image at each of the times in the set of periodic time intervals.

8. The method of claim 7 wherein the camera transmits the actual location of the part to the motion controller via an Ethernet link.

9. The method of claim 1 further including the steps of generating additional inspection data using the image of the part, transmitting the inspection data to the motion controller and storing the inspection data along with a part identifier for subsequent use.

10. The method of claim 1 wherein no images are obtained by the camera at times other than the predetermined trigger time.

11. The method of claim 1 also for use with a sensor, the step of determining the initial location of the part including using information from the sensor to determine the initial location of the part.

12. The method of claim 11 wherein the camera is a first camera and the field of view is a first field of view and wherein the sensor includes a second camera having a second field of view, the step of using information from the sensor to determine the initial location including causing the second camera to obtain an image of a part located in the second field of view and using the obtained image to determine the initial location of the part.

13. The method of claim 1 wherein the initial location is at a first station along a transfer line and the field of view of the camera is located at a second station spaced apart from the first station along the transfer line.

14. The method of claim 1 wherein the initial location is at a first station along a transfer line and the field of view of the camera is located at a second station spaced apart from the first station along the transfer line.

15. A method for use in an automated system that includes a camera having a field of view and a motion controller, the method comprising the steps of:
   identifying an initial location of a part where the initial location is outside and spaced apart from the field of view of the camera;
   using the initial location of the part to identify a predetermined trigger time at which it is anticipated that the part will be at an anticipated location within the second field of view;
   causing the camera to obtain an image at the predetermined trigger time at which it is anticipated that the part will be at the anticipated location within the field of view;

using the image obtained by the camera to identify part position information;

at the motion controller:
(i) monitoring Ethernet communications for part position information generated by the camera; and
(ii) using the part position information and the associated predetermined trigger time to adjust at least one operating characteristic of an automated system.

16. The method of claim 15 wherein the step of monitoring includes monitoring for part position information and an associated predetermined trigger time at which an image corresponding to the part position information was generated.

17. The method of claim 15 wherein the part position information includes an actual part location, the step of using the part position information including the motion controller comparing the actual part location to the anticipated part location to identify a position difference and using the position difference to adjust the at least one operating characteristic.

18. The method of claim 17 further including the step of the motion controller identifying the anticipated part location as a function of operating characteristics of the automated system.

19. The method of claim 15 wherein the part position information includes a position difference that is the difference between an actual part location in an obtained image and an anticipated part location in the obtained image.

20. The method of claim 19 further including the step of the motion controller identifying the anticipated part location at the predetermined trigger time.

21. The method of claim 15 further including the steps of the motion controller determining the predetermined trigger time and transmitting the predetermined trigger time to the camera via the Ethernet.

22. The method of claim 15 further including the step of using a master clock to time synchronize the motion controller and the camera.

23. The method of claim 15 also for use with a sensor, the step of determining the initial location of the part including using information from the sensor to determine the initial location of the part.

24. The method of claim 23 wherein the camera is a first camera and the field of view is a first field of view and wherein the sensor includes a second camera having a second field of view, the step of using information from the sensor to determine the initial location including causing the second camera to obtain an image of a part located in the second field of view and using the obtained image to determine the initial location of the part.

25. A method for use in an automated system that includes a camera that has a field of view (FOV) and a motion controller, the method comprising the steps of:

providing an Ethernet link between the camera and the motion controller wherein the motion controller and the camera communicate via the Ethernet link;
determining an initial location of the part prior to the time at which the part enters the FOV of the camera;
using a master clock to time synchronize the motion controller and the camera;
at the motion controller:
(i) using the initial location of the part to identify a predetermined trigger time at which it is anticipated that the part will be at an anticipated location within the FOV;
(ii) transmitting the trigger time to the camera;
at the camera:

(i) after the predetermined trigger time is received, when the predetermined trigger time occurs, obtaining an image of the FOV;
(ii) examining the image to identify the actual location of the part at the predetermined trigger time;
(iii) transmitting the actual location to the motion controller;
at the motion controller:
(iii) comparing the actual location to the anticipated location to generate a position difference.

26. The method of claim 25 further including the step of using the motion controller to adjust at least one operating characteristic of an automated system as a function of the position difference.

27. The method of claim 25 also for use with a sensor, the step of determining the initial location of the part including using information from the sensor to determine the initial location of the part.

28. The method of claim 27 wherein the camera is a first camera and the field of view is a first field of view and wherein the sensor includes a second camera having a second field of view, the step of using information from the sensor to determine the initial location including causing the second camera to obtain an image of a part located in the second field of view and using the obtained image to determine the initial location of the part.

29. A system for use in an automated environment, the system comprising:

a sensor for sensing a part at a location outside and prior to a field of view;
a processor programmed to use information from the sensor to determine an initial location of the part and to use the initial location to identify a predetermined trigger time at which it is anticipated that the part will be at an anticipated location within the field of view;
a camera including a camera processor and having the field of view, the camera processor programmed to, at the predetermined trigger time when it is anticipated that a part is at an anticipated location within the field of view, obtain an image;
a processor programmed to use the image obtained by the camera to determine an actual location of the part at the predetermined trigger time;
a processor programmed to compare the actual location and the anticipated location of the part to identify a position difference;
a motion controller processor programmed to use the position difference at the predetermined trigger time to adjust at least one operating characteristic of an automated system; and
a processor that periodically time synchronizes the motion controller and the camera.

30. The system of claim 29 wherein the processor that uses the obtained image to determine an actual location is the camera processor.

31. The system of claim 29 wherein the processor that compares to identify a position difference is the motion controller processor.

32. An apparatus for use in an automated system, the apparatus comprising:

a sensor for sensing a part at a location outside and prior to a field of view;
a processor programmed to use information from the sensor to determine an initial location of the part and to use the initial location to identify a predetermined trigger time at which it is anticipated that the part will be at an anticipated location within the field of view;

a camera having the field of view and including a processor programmed to obtain an image at the predetermined trigger time at which it is anticipated that the part will be at the anticipated location within the field of view;
using the image obtained by the second camera to identify part position information;
a motion controller processor programmed to perform the steps of:
(i) monitoring Ethernet communications for part position information generated by the camera and
(ii) using the part position information and the associated predetermined trigger time to adjust at least one operating characteristic of the automated system.

\* \* \* \* \*